United States Patent
Pottorff et al.

[11] 3,710,950
[45] Jan. 16, 1973

[54] MOBILE CRANE HOOK BLOCK STORAGE COMPARTMENT

[75] Inventors: Donald R. Pottorff, Mercersburg, Pa.; William E. Wright, Hagerstown, Md.

[73] Assignee: Walter Kidde & Company, Inc., Clifton, N.J.

[22] Filed: Dec. 7, 1970

[21] Appl. No.: 95,683

[52] U.S. Cl..................212/1, 280/150, 224/42.03 A
[51] Int. Cl...............................................B66c 13/00
[58] Field of Search.........212/1, 59; 280/150, 47.22; 224/42.03 A, 42.03 B, 42.07; 296/37, 24

[56] References Cited

UNITED STATES PATENTS

| | | | |
|---|---|---|---|
| 2,689,655 | 9/1954 | Potter et al. | 212/59 |
| 3,047,161 | 7/1962 | Thacker | 280/150 X |
| 808,739 | 1/1906 | Focht | 280/47.22 X |
| 2,880,827 | 4/1959 | Gilmore | 280/150 X |

*Primary Examiner*—Harvey C. Hornsby
*Assistant Examiner*—Merle F. Maffei
*Attorney*—Brady, O'Boyle & Gates

[57] ABSTRACT

A storage compartment or trough is provided near the forward end of the crane carrier to receive and support a rigged hook block. The hook block is stored out of the line of vision of the carrier operator and the danger of the hook block swinging during road travel is eliminated. The hook block is self loading and unloading with relation to the storage compartment.

10 Claims, 5 Drawing Figures

PATENTED JAN 16 1973

INVENTORS
DONALD R. POTTORFF
WILLIAM E. WRIGHT

BY Brady, O'Boyle & Gates

ATTORNEYS

PATENTED JAN 16 1973 3,710,950

MOBILE CRANE HOOK BLOCK STORAGE COMPARTMENT

BACKGROUND OF THE INVENTION

A problem arises in connection with the support and storage of large hook blocks or like heavy implements on mobile cranes during periods of non-use and during road travel. Large hook blocks may weigh up to 1500 pounds and consequently can only be lifted by a crane. Sometimes the hook block is merely laid on the ground while not in use and this is not satisfactory particularly where much mud is present. Also there is a chance that the hook block may be overlooked and left behind at a job site. During road travel there is frequently provided on the front bumper of the crane carrier an eye to which the crane hook can be attached. On certain cranes with relatively low carrier cabs a large hook block so attached to the front bumper may partially obstruct the line of vision of the carrier operator. For these and other reasons it is highly desirable to provide a storage compartment on the carrier near its forward end at one side of the carrier cab, where the large hook block may be safely and conveniently stored while not in use or while the mobile crane is traveling on the road. The hook block while stored is safely out of the line of vision of the driver and is firmly supported so that it cannot swing dangerously or become dislodged from its stored position. The construction and location of the storage compartment is such that the large hook block may be placed therein or lifted therefrom by the crane boom while the latter is in a telescoped or collapsed condition. This is very convenient since the large hook block is only employed on the boom when the boom is fully retracted or nearly so.

The provision of the hook block storage compartment on the crane carrier increases the overall efficiency of operation of the crane, enhances its safety and eliminates the need for placing the hook block on the ground with the possibility of its being left behind.

Other features and advantages of the invention will be apparent during the course of the following description.

BRIEF DESCRIPTION OF DRAWING FIGURES

DETAILED DESCRIPTION

Figure 3:
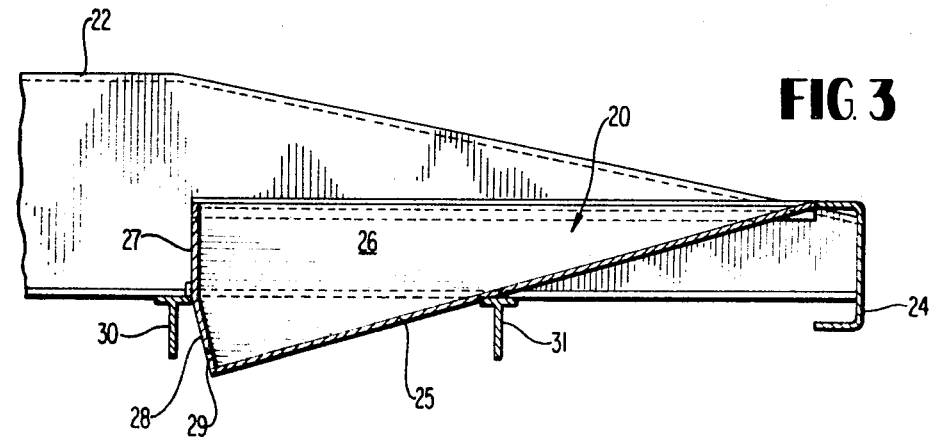
FIG. 3 is a longitudinal vertical section taken on line 3—3 of FIG. 2.

Referring to the drawings in detail, wherein like numerals designate like parts throughout, the numeral 10 designates the carrier of a mobile crane having a hydraulically operated telescoping crane boom 11 mounted thereon. The telescoping crane boom 11 has a main pivotal connection at 12 with a turntable structure 13 rotatable on the carrier 10 about a vertical axis. A boom elevating and lowering ram 14 has its cylinder end pivoted to the turntable structure at 15 and its rod end pivoted to the base section of the boom at 16. The turntable structure also serves to mount a cab 17 for the operator of the crane boom. A separate cab 18 for the operator of the carrier 10 is provided on the front end of the carrier near one side thereof immediately ahead of the carrier engine 19.

The invention is concerned with a support or storage compartment 20 for the large hook block 21 of the crane. The storage compartment 20 is located at the front end of the crane carrier 10 near one side of the cab 18 and between two main frame members 22 and 23 of the carrier. The storage compartment is in the nature of a shallow rest or well, and extends from the front bumper 24 of the carrier to the front of the engine enclosure on the carrier.

The storage compartment 20 has an inclined bottom wall 25 which slopes downwardly and rearwardly from the top of the bumper 24 to a point somewhat below the bottoms of the main frame members 22 and 23 immediately forwardly of the engine. The compartment or well 20 further includes parallel longitudinal vertical side walls 26 and a rear vertical wall section 27 whose upper edge is aligned horizontally with the top of the bumper 24. A rear wall extension 28 extends below the main frame members 22 and 23 and is somewhat inclined to the vertical and forms a square corner with the rear end of the bottom wall 25. The top of the storage compartment 20 is entirely open and all of the walls thereof are integrally joined into a rigid structure by welding. Drain slots 29 are provided at the bottom of wall extension 28 and at the rear of the inclined bottom wall 25 so that rain water will not collect in the storage compartment or well for the hook block 21.

To render the structure further strong and rigid and to eliminate possible damage to the radiator or engine enclosure of the carrier, suitable cross members 30 and 31 are welded to the bottoms of main frame members 22 and 23, as shown. The member 30 is located adjacent the rear wall 27 of the storage compartment, and joined thereto, and the member 31 is located beneath the bottom wall 25 in the area where the inclined bottom wall 25 crosses the lower edges of main frame members 22 and 23, substantially at the longitudinal center of the storage compartment. Other suitable reinforcement of the compartment 20 may be employed as found desirable.

Figure 1:
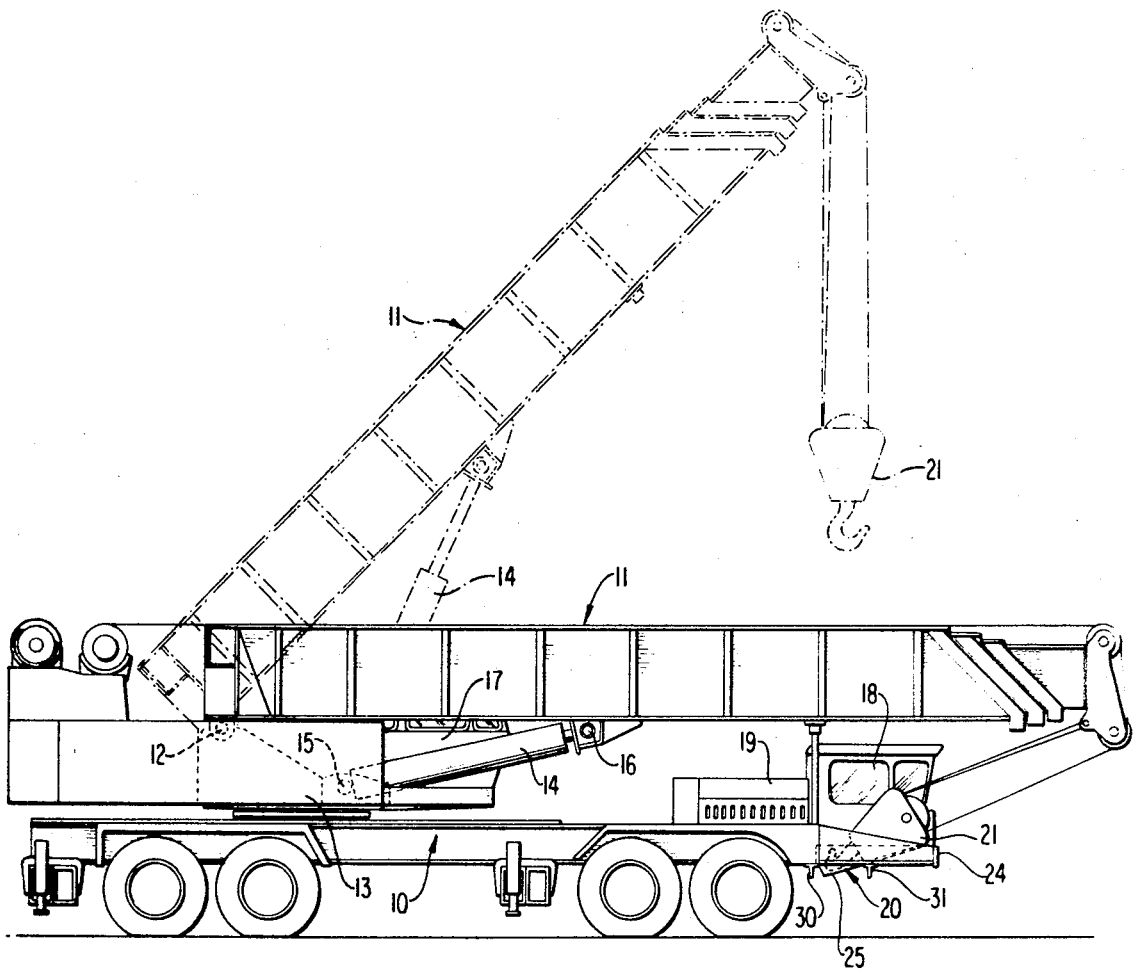
FIG. 1 is a side elevation of a mobile crane having a hook block support and storage compartment embodying the invention, the crane boom and hook block being shown elevated in broken lines.
Figure 2:
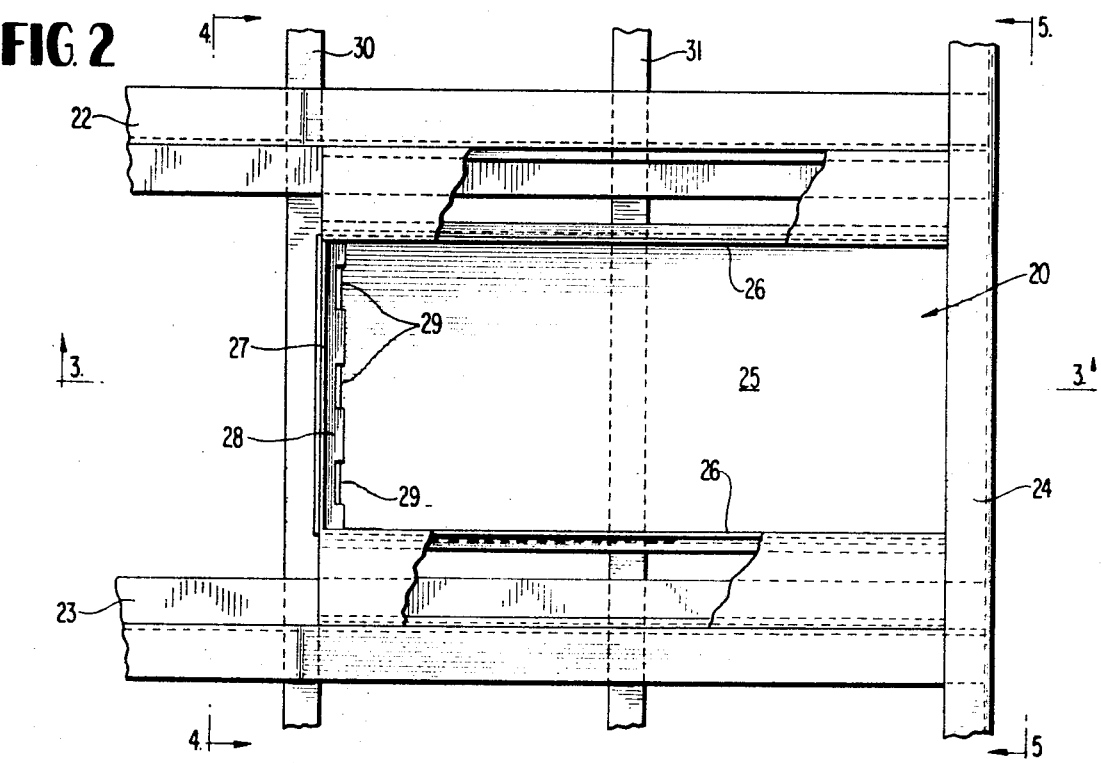
FIG. 2 is an enlarged fragmentary plan view of the hook block storage compartment.
Figure 4:
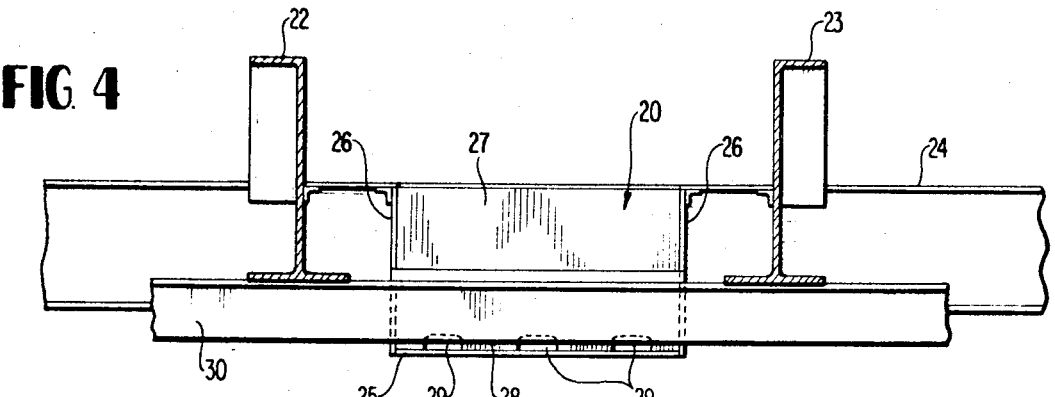
FIG. 4 is a transverse vertical section taken on line 4—4 of FIG. 2.
Figure 5:
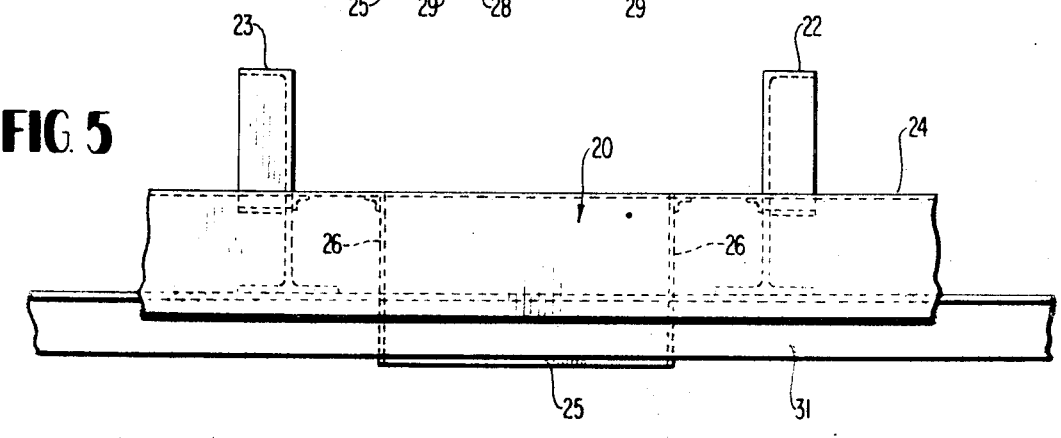
FIG. 5 is an end elevational view taken on line 5—5 of FIG. 2.

Normally the large and heavy hook block 21 will be rigged to the crane boom and used only while the plural section boom is fully or almost fully retracted as shown in FIG. 1. When the hook block 21 is in use and it is desired to place the same in the storage compartment 20 the boom 11 is elevated sufficiently to bring the hook block directly over the compartment 20, and the hook block is lowered by the winch line until the hook touches the inclined bottom wall 25 of the compartment or well 20. To lay the hook block down on the wall 25 as shown in full lines in FIG. 1, the boom 11 is lowered and only sufficient cable is paid out to prevent the hook block from being pulled over the leading end of the compartment 20. The side walls 26 are sufficiently spaced laterally to confine the hook block 21 between them in the position shown in FIG. 1. These walls do not allow the hook block to turn over onto its wide side however. The inclined compartment or well thus serves to stabilize the heavy hook block while it is stored and while traveling on the road and hook block is clear of the line of vision of the driver and is restrained against dangerous swinging. In order to remove the hook block from the storage compartment 20 it is only necessary to raise the boom 11 and again pay out sufficient winch line to avoid pulling the hook block over the front end of the compartment. The hook block is therefore self-loading and unloading with relation to the storage compartment.

While the invention has been described in terms of a support or storage means for a large hook block, it should be understood that the compartment 20 can be utilized to support or store other types of heavy crane implements and is not limited to storing hook blocks.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A crane carrier including a pair of spaced longitudinal main frame members, a bumper at the forward end of said carrier rigidly interconnecting the forward ends of said main frame members, a crane implement rest and storage means disposed between the main frame members and substantially integrated therewith and constituting a storage well immediately rearwardly of the bumper, said well being progressively shallower forwardly toward the bumper and having a bottom wall which slopes downwardly and rearwardly and the forward end of which is substantially level with the top of the bumper and secured thereto, and an abutment rising from the rear end of said sloping bottom wall.

2. The structure of claim 1 and transverse reinforcing means underlying said well and connected with the main frame members.

3. The structure of claim 2 and said well having drain opening means near its bottom.

4. A crane carrier as set forth in claim 1 and transverse reinforcing members secured to the bottoms of said pair of main frame members and connected with and transversely spanning said well.

5. A crane carrier as set forth in claim 1 and laterally spaced side walls rising from the side edges of said sloping bottom wall.

6. A crane carrier including a pair of spaced longitudinal main frame members, a bumper at the forward end of said carrier rigidly interconnecting the forward ends of said main frame members, a crane implement rest and storage means disposed between the main frame members and substantially integrated therewith and constituting a storage well immediately rearwardly of the bumper, said well being progressively shallower forwardly toward the bumper and having a bottom wall which slopes downwardly and rearwardly and the forward end of which is substantially level with the top of the bumper, and an abutment plate rising from the rear end of said sloping bottom wall to substantially the level of the top of the bumper.

7. The structure of claim 6 and laterally spaced side walls rising from the side edges of said sloping bottom wall.

8. The structure of claim 7 and said side walls rising to substantially the level of the top of the bumper.

9. A crane carrier as set forth in claim 6 and transverse reinforcing members secured to the bottoms of said pair of main frame members and connected with and transversely spanning said well.

10. The structure of claim 7 and said well having drain openings at the rear lower corner thereof.

* * * * *